(12) United States Patent
Kister (10) Patent No.: US 10,434,583 B2
(45) Date of Patent: Oct. 8, 2019

(54) MILLING CUTTER

(71) Applicant: CERATIZIT LUXEMBOURG S.A.R.L., Mamer (LU)

(72) Inventor: Fabien Kister, Metz (FR)

(73) Assignee: CERATIZIT Luxembourg S.a.r.l, Mamer (LU)

( * ) Notice: Subject to any disclaimer, the term of this patent is extended or adjusted under 35 U.S.C. 154(b) by 68 days.

(21) Appl. No.: 15/639,160

(22) Filed: Jun. 30, 2017

(65) Prior Publication Data

US 2018/0001399 A1    Jan. 4, 2018

(30) Foreign Application Priority Data

Jun. 30, 2016   (EP) ..................... 16001459

(51) Int. Cl.
| | | |
|---|---|---|
| *B23C 5/22* | (2006.01) | |
| *B23C 5/24* | (2006.01) | |
| *B23C 5/20* | (2006.01) | |
| *B23C 5/00* | (2006.01) | |

(52) U.S. Cl.
CPC .............. *B23C 5/202* (2013.01); *B23C 5/006* (2013.01); *B23C 5/207* (2013.01); *B23C 5/2213* (2013.01); *B23C 5/2221* (2013.01); *B23C 5/241* (2013.01); *B23C 5/2479* (2013.01); *B23C 2200/0483* (2013.01); *B23C 2200/12* (2013.01); *B23C 2200/125* (2013.01); *B23C 2200/205* (2013.01); *B23C 2210/168* (2013.01)

(58) Field of Classification Search
CPC .......... B23C 2200/12; B23C 2200/125; B23C 5/207; B23C 5/2221; B23C 2200/0483; B23C 2200/205; B23C 2210/168; B23C 5/006; B23C 5/202; B23C 5/2213; B23C 5/241; B23C 5/2479
See application file for complete search history.

(56) References Cited

U.S. PATENT DOCUMENTS

| | | | | |
|---|---|---|---|---|
| 3,484,919 | A | * 12/1969 | Stier ................... | B23B 27/1622 407/103 |
| 4,393,735 | A | * 7/1983 | Eckle ..................... | B23B 27/00 407/101 |
| 5,232,317 | A | 8/1993 | Peuterbaugh | |

(Continued)

FOREIGN PATENT DOCUMENTS

| | | |
|---|---|---|
| DE | 10308037 A1 | 9/2004 |
| FR | 1442774 A | 5/1966 |

(Continued)

*Primary Examiner* — Sara Addisu
(74) *Attorney, Agent, or Firm* — Laurence A. Greenberg; Werner H. Stemer; Ralph E. Locher (57) ABSTRACT

A milling cutting insert has a substantially triangular shape. The cutting insert contains a top side, an underside, and circumferential side surfaces extending between the top side and the underside. Cutting edges are formed at the transition of the circumferential side surfaces to the top side and/or the underside. On the circumferential side surfaces at least two discrete planar abutment surfaces are formed for positioning the cutting insert in a tool holder. The at least two discrete planar abutment surfaces are inclined with respect to each other at an outer angle of between 190° and 220° and the abutment surfaces are spaced from each other with respect to the circumferential direction of the cutting insert.

13 Claims, 4 Drawing Sheets

(56) References Cited

U.S. PATENT DOCUMENTS

| | | | | |
|---|---|---|---|---|
| 5,365,805 A * | 11/1994 | Pantzar | .................... | B23C 5/202 407/114 |
| 6,126,366 A * | 10/2000 | Lundblad | ............ | B23B 27/1622 407/102 |
| 6,152,658 A * | 11/2000 | Satran | ..................... | B23B 27/00 407/103 |
| 6,164,878 A * | 12/2000 | Satran | .................... | B23C 5/2221 407/113 |
| 9,289,834 B2 * | 3/2016 | Park | ........................ | B23C 5/06 |
| 2002/0098048 A1 * | 7/2002 | Satran | .................... | B23C 5/2221 407/35 |
| 2004/0165961 A1 * | 8/2004 | Nagaya | .................... | B23C 5/207 407/113 |
| 2006/0088390 A1 * | 4/2006 | Wallstrom | ........... | B23B 27/1662 407/103 |
| 2009/0252565 A1 * | 10/2009 | Morgulis | .............. | B23B 27/065 407/100 |
| 2010/0028092 A1 * | 2/2010 | Choi | ........................ | B23C 5/202 407/40 |
| 2010/0054873 A1 * | 3/2010 | Men | ......................... | B23C 5/202 407/42 |
| 2010/0266354 A1 * | 10/2010 | Zitzlaff | ................ | B23B 27/145 407/113 |
| 2010/0329800 A1 * | 12/2010 | Edler | .................... | B23B 27/145 407/114 |
| 2012/0070239 A1 | 3/2012 | Park et al. | | |
| 2013/0142581 A1 | 6/2013 | Volokh | | |
| 2013/0202371 A1 | 8/2013 | Chen | | |
| 2013/0287506 A1 * | 10/2013 | Morgulis | .............. | B23B 27/065 407/103 |
| 2013/0336734 A1 * | 12/2013 | Morgulis | .............. | B23B 27/065 407/102 |
| 2014/0072377 A1 * | 3/2014 | Sunnvius | ................ | B23C 5/207 407/113 |
| 2014/0186130 A1 * | 7/2014 | Hecht | ................... | B23B 27/007 407/100 |
| 2015/0165532 A1 * | 6/2015 | Yamamoto | .............. | B23C 5/202 407/67 |
| 2016/0107248 A1 * | 4/2016 | Smycek | .................. | B23C 5/207 407/33 |

FOREIGN PATENT DOCUMENTS

WO 2011089552 A1 7/2011
WO 2014032789 A1 3/2014

\* cited by examiner

MILLING CUTTER

CROSS-REFERENCE TO RELATED APPLICATION

This application claims the priority, under 35 U.S.C. § 119, of European application EP 16001459.3, filed Jun. 30, 2016; the prior application is herewith incorporated by reference in its entirety.

BACKGROUND OF THE INVENTION

Field of the Invention

The invention relates in general to a milling cutting insert.

International patent disclosure WO2014/032789A1 shows a milling tool holder and an oval-shaped milling cutting insert to be placed in the tool holder, wherein a first and a second cutting edge part are individually usable by rotation of the cutting insert about a symmetry axis by an angle of <45°. The arrangement allows the cutting insert to be used either in a manner for conventional milling operations with a relatively large cutting depth or in high feed milling applications with a small cutting depth.

Further it is known to realize cutting inserts as so-called indexable cutting inserts. Indexable cutting inserts have a plurality of usable cutting edges that can be used independently one after another by turning ("indexing") the cutting insert. With indexing, the cutting insert is rotated such that a new cutting edge—lying between two cutting corners—is offered to a workpiece surface. With so-called positive cutting inserts, the wedge angle (the angle between the rake surface and the clearance surface) is less than 90°, resulting in a positive clearance angle. In consequence, positive cutting inserts can be used on one side only. Negative cutting inserts have a wedge angle of 90° or more. They can be single-sided or may be configured as double-sided inserts.

In the case of triangular shaped cutting inserts there are three indexing positions per side. The number of usable cutting edges doubles when the cutting insert is configured as double-sided cutting insert, i.e. cutting edges on both sides (top-side and underside) of the cutting insert may be used.

In the context of the present application, the terms "top side" and "underside" are used to denote surfaces of the milling cutting insert. It should be noted however that—depending on the actual orientation of the milling cutting insert—the top side may also be situated on a lower position as compared to the underside. For triangular shaped cutting inserts there are three indexing positions per side. By rotating the cutting insert by 120° the next indexing position is reached. Square-shaped cutting inserts have four indexing positions per side at 90°, respectively. For round cutting inserts there are generally no discrete indexing positions.

SUMMARY OF THE INVENTION

It is accordingly an object of the invention to provide an improved milling cutting insert that overcomes the above-mentioned disadvantages of the prior art devices of this general type.

The milling cutting insert according to the invention contains a top side, an underside, circumferential side surfaces extending between the top side and the underside, and cutting edges being formed at the transition of the circumferential side surfaces to the top side and/or the underside. On the circumferential side surfaces at least two discrete planar abutment surfaces are formed for positioning the cutting insert in a tool holder. The at least two discrete planar protruding abutment surfaces are inclined with respect to each other at an outer angle of between 190° and 220°. The abutment surfaces are spaced from each other with respect to a circumferential direction of the cutting insert.

The milling cutting insert of the invention has a substantially triangular shape with three preferably convex side surfaces. The convexity of the cutting edges (side walls are curved outwards as can be seen in top view of the cutting insert) is beneficial in terms of feed rates and cutting forces.

The abutment surfaces are spaced from each other with respect to the circumferential direction of the cutting insert. The abutment surfaces do not form a continuous ring or rim but are discrete separate surfaces formed on the side surfaces. Preferably, there are exactly two abutment surfaces per side surface.

An outer angle between the abutment surfaces of between 190° and 220° means that the normal vectors of the abutment surfaces on one side surface enclose an angle of between 10° and 40°.

The at least two discrete planar abutment surfaces on a circumferential side surface, together with another set of at least two discrete planar abutment surfaces formed on a neighbouring side surface form two pairs of abutment surfaces for positioning the cutting insert at two different discrete angular positions for each indexing position.

The abutment surfaces are inclined with respect to each other such that when brought into contact to corresponding mating surfaces of a tool holder the cutting insert can assume two distinct angular positions for each indexing position. This has the particular advantage that the cutting insert may be safely secured at two different discrete angular positions per each indexing position.

In the tool holder the cutting insert is positioned by the discrete planar abutment surfaces that can be brought into contact to corresponding contact surfaces of a seat formed in the tool holder. The cutting insert can be axially clamped in the seat by a fastening screw the threaded portion of which is passed through the central bore of the insert and can be engaged with a corresponding threaded bore in the tool holder. The mating surfaces for this axial clamping are the respective underside of the cutting tool and the ground of the seat.

In addition to the axial clamping, the fixation by the abutment surfaces prevents a rotation of the cutting insert with respect to the seat.

The positioning takes places through the abutment surfaces such, that one abutment surface formed on a first circumferential side surface, together with another abutment surface formed on another circumferential side surface, the two circumferential side surfaces being adjacent to each other in the seat, the respective abutment surfaces are forming a pair of abutment surfaces actually being in contact with a contact surface of the seat.

That is, out of the at least two abutment surfaces formed on a circumferential side surface just one abutment surface per side surface actually is in contact with the contact surface of the seat at the same time.

Thereby two discrete angular positions of the cutting insert per indexing position can be realized.

The cutting insert can be mounted in a first angular position that is suited for larger cutting depths as the case for traditional milling operations.

By rotating the cutting insert by an angle of, for example between 10° through 40°, preferably by an angle of 20° through 30°, particularly preferably by an angle of 25°, the cutting insert can be brought in a second angular position with small cutting depths as it is desired for high feed milling operations, while maintaining the same indexing position as for the first angular position. In other words, by rotating the cutting insert at a certain angle, the cutting insert can be "switched" between two angular positions, each angular position being suited for a certain milling operation, while maintaining the same indexing position. Same indexing position means that still the same cutting edge between two cutting corners is being used. The actual value of the angle between the first and the second angular position is defined by the angle enclosed between the two abutment surfaces on one side surface.

For right-turning tool holders, the cutting insert can be rotated from an angular position for traditional milling with a large approach angle into an angular position for high feed milling with a reduced approach angle by a clockwise rotation by the angle.

The approach angle (entering angle) is the angle between the main, leading cutting edge of the insert and the workpiece surface.

In other words, through its design the cutting insert of the invention can be used at two different approach angles for the same indexing position.

As another option and advantage of the inventive cutting insert, two sections of a cutting edge between two cutting corners can be used for milling at small cutting depths: first, a section of the cutting edge at the angular position with larger approach angle can be used. By rotating the cutting insert by the angle, the remaining "fresh" portion of the cutting edge is available for machining. Thus the material utilization of the cutting insert is improved.

The above is particularly advantageous, as the cutting insert can be used for multiple applications and it can be used for multiple applications with the same tool holder. The cutting insert of the invention can be used for traditional milling at high cutting depths as well as for high feed milling with high feed rates and small cutting depths. The same tool holder can be used for both types of milling operations.

According to one embodiment the abutment surfaces protrude from the side walls. In other words they stick out of the side surfaces.

It can be provided that the abutment surfaces are formed such that in a top view on the cutting insert, the abutment surfaces extend beyond a cutting edge formed at the transition of a side surface to the top side or underside, respectively.

According to another embodiment the abutment surfaces are formed in recesses within the side surfaces.

According to yet another embodiment, the abutment surfaces are substantially perpendicular to the top side. This means the normal vectors of the abutment surfaces are perpendicular to a plane perpendicular to a symmetry axis, the symmetry axis being perpendicular to the top side. This embodiment is particularly suited for negative cutting inserts. With abutment surfaces being substantially perpendicular to the top side, the cutting insert can be used on both sides.

With positive inserts, the side surfaces can be inclined in an angle less than 90° at the top side. In case of positive inserts, the abutment surfaces generally are not perpendicular to the top side. They may be, however, also perpendicular to the top side.

Generally, the invention can be used both for negative and positive cutting inserts.

Given the three independent cutting edges for the triangular shaped cutting insert, and the two different angular mounting positions per indexing position, there are six usable cutting positions per side of the cutting insert. For a double-sided version, one would obtain twelve cutting positions in total.

Preferably, the cutting insert has an ovalized triangular shape. Ovalized means, that the cutting edges between the cutting corners are not straight but shaped convexly. When considering the connections between the cutting corners as bases of a triangle that can be inscribed in the top view of the cutting insert, the cutting edges are curved outwards these bases. Such convexly curved cutting edges are beneficial in terms of cutting edge stability.

In yet another preferred embodiment, the cutting edges are at least partially convexly curved with respect to a side view of the cutting insert. In other words, the cutting edges extend upwards from the top side and the underside (in case of double sided cutting inserts), respectively. The cutting edges may be composed of straight and curved portions, or are continuously curved. This preferred shape leads to improved cutting performance as a peeling cut is achieved.

Preferably the cutting insert is adapted for radial mounting on a tool holder.

Protection is also sought for a milling tool having a rotation axis about which the milling tool is rotatable for milling, a radial direction perpendicular to the rotation axis, with a plurality of cutting insert receiving seats adapted for mounting a plurality of cutting inserts according to at least one of the preceding claims.

According to a preferred embodiment the cutting insert receiving seats are adapted such that cutting inserts inserted therein can be positioned at two distinct angular positions for each indexing position of the cutting insert.

According to a preferred development of the milling tool the cutting insert receiving seats are adapted such that the cutting inserts are mountable to the cutting insert receiving seats in:
a) a first orientation in which a base of the cutting insert facing away from the receiving seat encloses an angle between 0° and 10° with the radial direction; and
b) a second orientation in which the base of the cutting insert facing away from the receiving seat encloses an angle between 10° and 40° with the radial direction.

As the base, the connection between two cutting corners is understood. As the cutting edges are preferably curved, the angle can best be defined between the radial direction and the bases. In case of straight cutting edges the bases would coincide with the cutting edges.

Protection is also sought for a milling tool with cutting inserts according to at least one of the preceding claims are mounted in the cutting insert receiving seats. Preferably, the cutting inserts are radially mounted in the cutting insert receiving seats.

Other features which are considered as characteristic for the invention are set forth in the appended claims.

Although the invention is illustrated and described herein as embodied in a milling cutter, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
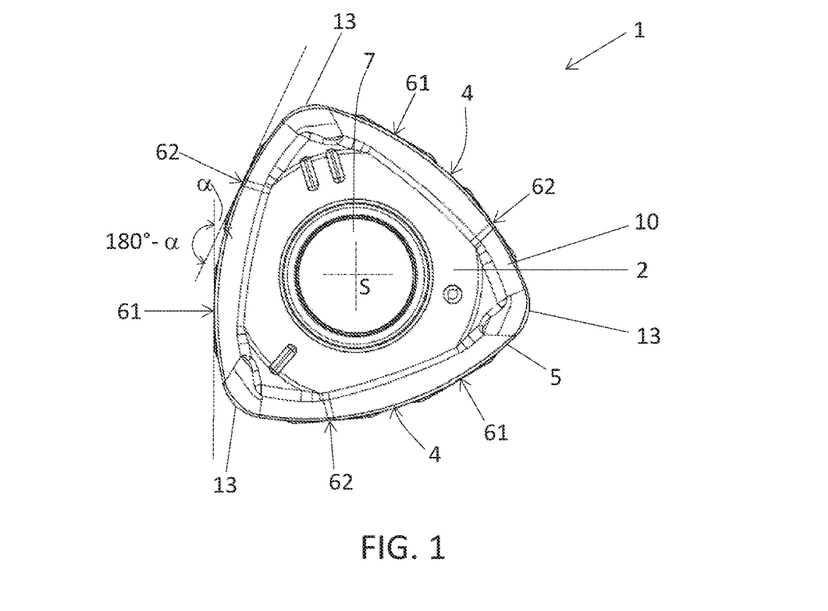
FIG. 1 is a diagrammatic, top view of a cutting insert according to a first embodiment (negative type)

Referring now to the figures of the drawings in detail and first, particularly to FIG. 1 thereof, there is shown a top view of a cutting insert 1 of an embodiment of the invention. The cutting insert 1, in this example, has a basically triangular shape with convexly curved side faces 4. At the transition of at least one side face 4 to a top side 2, preferably at the transition of each side face 4 to the top side 2 cutting edges 5 are formed. The side faces 4 are perpendicular to the top side 2.

At the transition of the cutting edges 5 to the top side 2 a chip breaker structure 10 is formed. Between the cutting edges 5 there are cutting corners 13. The cutting insert 1 has a central bore 7 for accommodating a fixing screw, by which the cutting insert can be fixed to a tool holder (not shown here).

On a side face 4 of the cutting insert 1 there are formed each two discrete planar protruding abutment surfaces 61, 62 for positioning the cutting insert 1 in a tool holder. The abutment surfaces 61, 62 are perpendicular to the top side 2. In other words, the normal vectors of the abutment surfaces 61, 62 each lie within a plane to which a symmetry axis S running parallel to the bore 7 is perpendicular. The cutting insert 1 of the present embodiment is of the "negative" type, that is, the clearance angle inherent to the cutting insert itself is zero.

In the present embodiment, the abutment surfaces 61, 62 are formed such that in a top view on the cutting insert 1, the abutment surfaces 61, 62 extend beyond the cutting edge 5 formed at the transition of a side surface 4 to the top side 2 or underside 3, respectively.

Further, the abutment surfaces 61, 62 formed on one side surface 4 are tilted to each other at an outer angle of between 190° through 220°, in the present example at an angle of 205°. In other words, the normal vectors of the abutment surfaces 61, 62 on one side surface 4 in this example confine an angle α of 25°. The outer angle results from 180°+α.

In FIG. 1, the orientation of the abutment surfaces 61, 62 of one side face 4 is made visible by dashed auxiliary lines.

The tilt of the abutment surfaces 61, 62 allows mounting the cutting insert 1 in a tool holder at two distinct angular positions for each indexing position.

The abutment surfaces 61, 62 may have circular or elliptical shape. Preferably they are placed around the equatorial plane of the cutting insert 1, i.e. in the middle between top side 2 and underside 3. They are spaced from each other with respect to a circumferential extension on the side surface 4.

To ease manufacturing via a powder metallurgical route, the flanks of the abutment surfaces 61, 62, that is, the transitions from the actual abutment surfaces 61, 62 to the side faces 4 are shaped gradually with a radius.

The cutting insert 1 preferably is a double-sided insert, that is, the tope side 2 as well as the underside 3 can act as rake surfaces. Hence, the cutting insert 1 of the present embodiment is 6-fold indexable.

By virtue of the abutment surfaces 61, 62 tilted at an angle α the cutting insert 1 is usable at 12 positions, as for each indexing positions two angular positions can be used.

Figure 2:
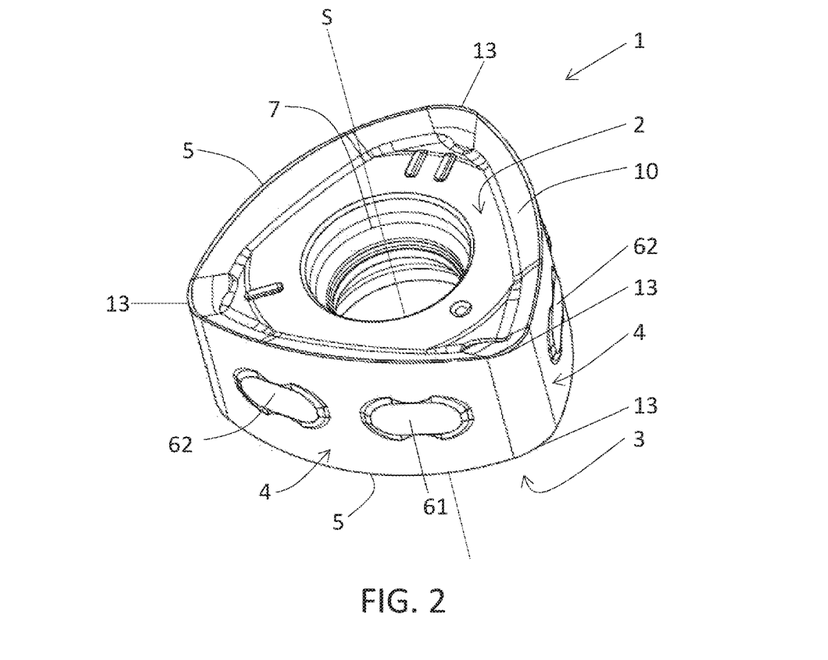
FIG. 2 is a perspective view of the cutting insert according to the first embodiment.

In FIG. 2 the cutting insert 1 of the above embodiment is shown in a perspective view.

As can be seen from FIG. 2, the abutment surfaces 61, 62 are arranged symmetrically with respect to a middle or equatorial plane (not shown). They are equally distanced between the top side 2 and the underside 3.

The cutting edges 5 preferably are upwardly curved: between the cutting corners 13 the cutting edges 5 exhibit a curvature which is convex in a side view on a side surface 4. That is, in a side view on a side surface 4 the cutting edge 5 is not a straight line. The cutting edge 5 is not necessarily continuously convex; it may exhibit straight or even concave portions.

Such upwardly curved cutting edges 5 have proven beneficial in terms of cutting forces and cutting quality. This shape is particularly desirable for high feed milling as a peeling cut is achieved.

The cutting edges 5 may be composed of straight and curved portions, or are continuously curved. To clarify further, the cutting edges 5 are preferably both convex in a top view on the cutting insert 1 as previously explained, and additionally—at least section wise—curved upwards with respect to a side view on the cutting insert 1.

FIGS. 3A-B and 4A-B show variants of the cutting insert 1 of the invention as further embodiments. Here, the cutting insert 1 is of the positive type, that is, it exhibits a clearance angle greater than zero inherent to the cutting insert. The side faces 4 are inclined towards the top side 2 at an angle smaller than 90°. Being a positive type cutting insert, the cutting insert 1 of these embodiments can be used on one side only. It has three indexing positions.

Figure 3A:
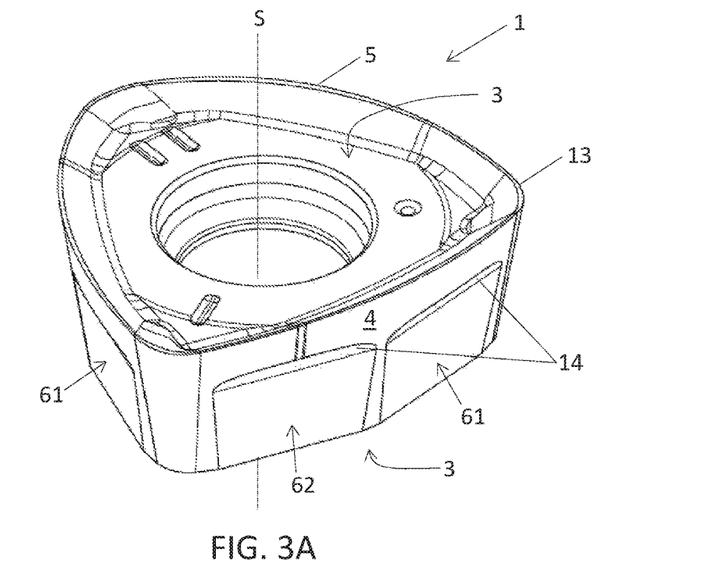
FIG. 3A, 3B are perspective views of a positive type embodiment.
Figure 3B:
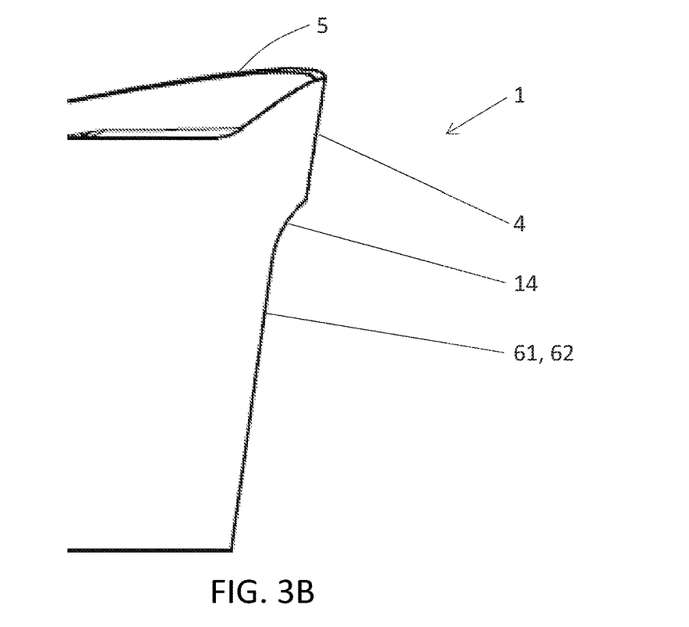

FIG. 3A shows a first positive type variant in a perspective view; FIG. 3b a partial cross-section of the same, with the section plane containing a normal vector of an abutment surface 61, 62, the section plane cutting an abutment surface.

Figure 4A:
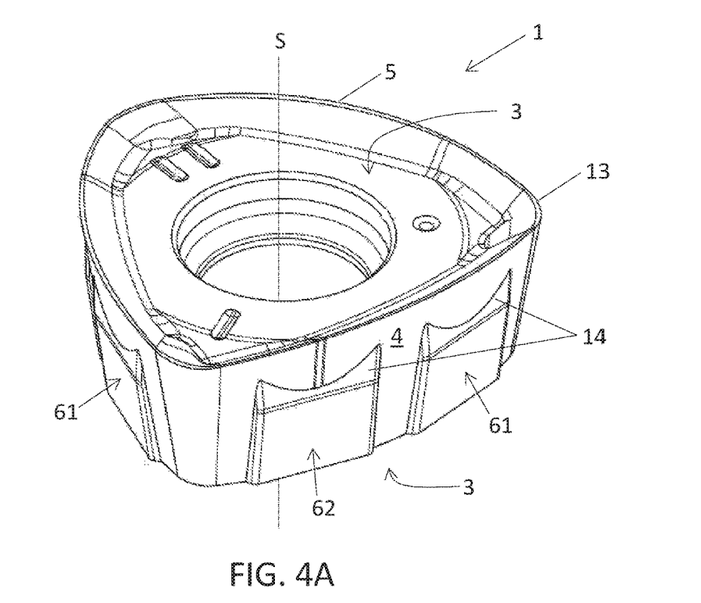
FIG. 4A, 4B are perspective views of a further positive type embodiment.
Figure 4B:
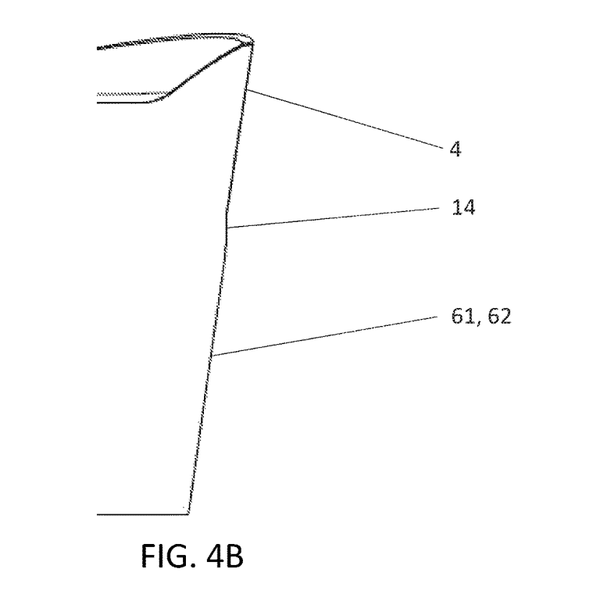

FIG. 4A shows a second positive type variant in a perspective view; FIG. 4B a partial cross-section of the same, with the section plane containing a normal vector of an abutment surface 61, 62, the section plane cutting an abutment surface.

The variants of FIGS. 3A-B and FIGS. 4A-B differ in details of the abutment surfaces 61, 62.

In the variant of FIG. 3A, the abutment surfaces 61, 62 are formed within recesses in the sides walls 4. The abutment surfaces 61, 62 may be parallel to the side walls, or may be inclined at a steeper angle (more negative) or at a flatter angle (less negative) than the side walls 4.

As can be seen best in the cross-section given in FIG. 3B, the abutment surfaces 61, 62 are formed in recesses within the side walls 4. The recesses are created via transition areas 14. The transition areas 14 are surfaces inclined at an angle steeper than the side surface 4. Steeper angle here means that the angle confined between a transition area 14 and the top side 2 is smaller than the angle between the side surface 4 and the top side 2.

The cutting edge 5 is upwardly curved, i.e. it has a convex shape. This feature can be realized for positive as well as for negative type cutting inserts 1.

In the variant of FIG. 4A, the abutment surfaces 61, 62 are formed as protruding surfaces tilted towards the side walls 4. They may be inclined at an angle steeper or flatter than the side walls 4.

As can be seen from the cross-section given in FIG. 4B, a transition area 14 is inclined at an angle less steep than the side wall 4, thus forming a protrusion at which the abutment surfaces 61, 62 adjoin. The abutment surfaces 61, 62 may be inclined at the same angle as the side wall 4 or at an angle steeper than the side wall 4, with respect to the top side 3.

The variants of FIGS. 3A and 4A require a seat 9 of a tool holder 8 to be tapered for accommodating the cutting insert 1. Tapered means that the seat 9 narrows from its opening to its ground. At the flanks (walls) of the seat 9 corresponding contact surfaces can be foreseen that match the abutment surfaces 61, 62.

Same as for the negative cutting insert of previous embodiments, the positive cutting insert 1 of the embodiments according to FIG. 3A and FIG. 4A, respectively, can be fixed at two distinct angular positions per indexing position.

Figure 5:
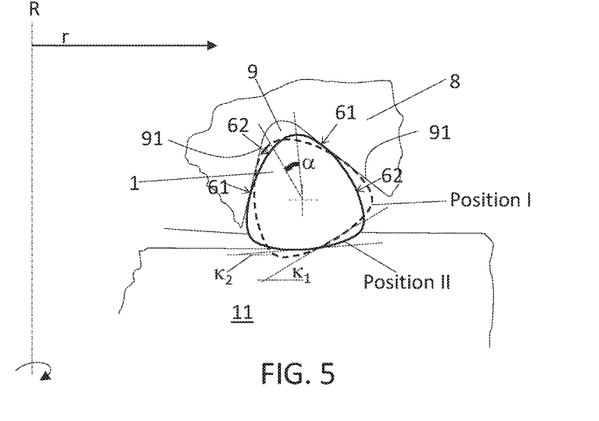
FIG. 5 is a schematic illustration of a mounting of the cutting insert of the invention in a seat in a tool holder.

FIG. 5 shows the cutting insert 1 in an assembly situation mounted in a tool holder 8. The cutting insert 1 is radially mounted.

The tool holder 8 has a seat 9, in which base the cutting insert 1 can be fixed by a mounting screw (not shown).

The cutting insert 1 with its abutment surfaces 61, 62 fits to flanks 91 of the seat 9. An arrow r indicates the radially outward direction with respect to the tool holder 8. In operation, the tool holder rotates around a rotation axis R as denoted by an arrow. In the present view, the direction of movement of the cutting insert 1 is perpendicular to the drawing plane towards the viewer.

By virtue of the two discrete protruding abutment surfaces 61, 62 on each side surface 4, the cutting insert 1 can be positioned at two defined angular positions in the tool holder 8:
a) at a first angular position, as shown by dashed lines as Position I, which is foreseen for large cutting depths, at a first approach angle $\kappa_1$ towards a workpiece 11, and
b) at a second angular position, shown as Position II, suited for small cutting depths and high feed rates, at an second approach angle $\kappa_2$ towards the workpiece 11, wherein $\kappa_2 < \kappa_1$.

The two distinct angular positions may also be described in terms of the respective abutment surfaces 61, 62 actually engaged with the flanks 91 of the seat 9. In Position I, the abutment surface 62 which is most outwards radially (radial direction r) is in contact with a flank 91 of the seat 9. The second contact is formed by the further abutment surface 62 at 120° counter-clockwise thereof. Generally, the cutting insert 1 in each case is fixed by two abutment surfaces, each one of them on different side surfaces. Given the triangular symmetry of the cutting insert, the cutting insert 1 is fixed by abutment surfaces that enclose an angle of 120° with each other. To clarify further, the cutting insert is either fixed by a first set of abutment surfaces 61 (Position II in the drawing) or a second set of abutment surfaces 62 (Position I in the drawing).

Thus, the cutting insert 1 can be used for two very different machining operations, traditional milling and high feed milling.

The workpiece 11 schematically is shown for the case of a small approach angle $\kappa_2$ (corresponding to mounting position II) and resulting small cutting depths. For a larger approach angle $\kappa_1$ (corresponding to mounting position I) larger cutting depths can be realized.

The cutting insert 1 of the invention combines the benefits of a round cutting edge being the most stable cutting edge geometry with the advantage of a longer usable cutting edge length as compared to a round insert of the same size (volume). Thus, cutting forces will be distributed along longer cutting edges, resulting in a higher life time of the cutting insert 1.

At position I the cutting insert 1 is positioned by the abutment surfaces 61 with the flanks 91 of the seat 9, and can be transferred into Position II by a counter-clockwise rotation by the angle α, where at Position II the cutting insert 1 is in contact to the flanks 91 by the abutment surfaces 62.

Figure 6:
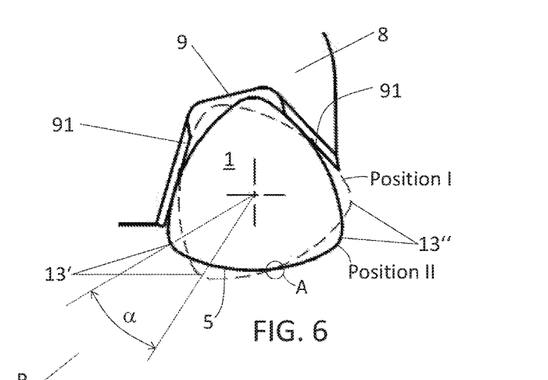
FIG. 6 is an alternative illustration of the cutting insert of the invention in a seat in a tool holder.

FIG. 6 shows an alternative representation of the cutting insert 1 in its mounting position. Again, Position I illustrates the angular position for traditional milling operations at relatively large approach angles, while Position II illustrates the angular position of the insert 1 suited for high feed milling operations at relatively small approach angles.

The design of the inventive cutting insert 1 further opens the possibility of using two different sections of the same cutting edge 5 (same meaning that the respective cutting edge 5 extends between the same cutting corners 13) for high feed milling, i.e. milling with small approach angles: one could first use the cutting insert 1 fixed in the angular position through abutment surfaces 62—which generally would be used for traditional milling with large cutting depths—for high feed milling with small cutting depths.

By rotating the cutting insert 1 into the angular position defined by the contact through abutment surfaces 61 one then obtains a second "fresh" section of the cutting edge 13 for a high feed milling operation. Thus, the whole length of the cutting edge 13 can be used, resulting in improved material utilization of the cutting insert. In this way, the cutting insert 1 has 12 cutting positions for high feed milling in case of a double-sided insert, or 6 cutting positions in case of a single-sided insert.

This is illustrated by FIG. 6: point A denotes the approximately middle of the cutting edge 5 or the point of intersection between the cutting edge 5 in position I and the cutting edge 5 in position II. For milling with small cutting depths (e.g. high feed milling) one could first use the cutting edge 5 between cutting corner 13' and point A in Position I, then rotating the cutting insert 1 about the angle α into Position II and then use the remaining cutting edge 5 between point A and the cutting corner 13". Both settings result in the same cutting depths.

The design of the inventive cutting insert 1 is also beneficial in terms of manufacturability. It can be manufactured by powder metallurgy, for example by uniaxial pressing and sintering. No time consuming grinding operations are required. The cutting insert typically is made from hard metal (tungsten carbide and binder), or other wear resistant materials.

A further advantage of the cutting insert 1 of the invention is that the abutment surfaces 61, 62 do not require elaborate machining of the flanks 91 of the seat 9; instead they can be machined as simple planar mating surfaces.

Figure 7:
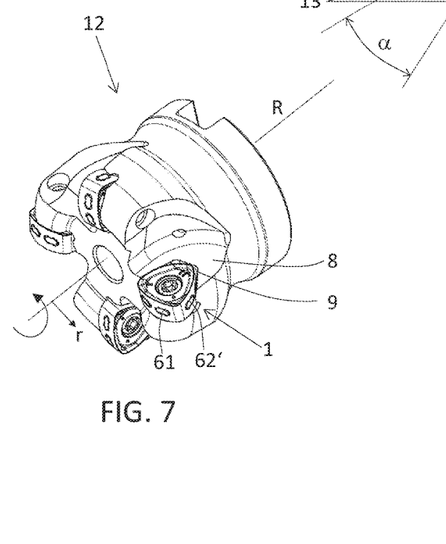
FIG. 7 is a perspective view of an assembly of the cutting insert of the invention and the tool holder.

FIG. 7 shows a milling tool 12 with cutting inserts 1 of the invention radially mounted therein. The milling tool 12 rotates around the rotation axis R as illustrated by the arrow. In the present case, the milling tool 12 is designed to accommodate four cutting inserts 1.

The receiving seats 9 of the milling tool 12 are adapted such that cutting inserts 1 inserted therein can be positioned at two distinct angular positions for each indexing position of the cutting insert 1 as previously explained for the cutting insert 1.

In the mounting position shown in the FIG. 7, the cutting inserts 1 are mounted for high feed milling, i.e. at small approach angles. This can be seen from the abutment surface 62' being visible, that is, not being inside the seat 9. In this example, the seats 9 are so configured that the abutment surface 62' is visible from a radially outward position when the cutting insert 1 is mounted in the seat 9 at the angular position II, that is, for a small approach angle and small cutting depth. In that way, an operator can easily control the correct mounting position of the cutting insert 1.

In an example, the cutting inserts 1 are mountable to the cutting insert receiving seats 9 in:
a) a first orientation in which a base b of the cutting insert 1 facing away from the receiving seat 9 encloses an angle between 0° and 20° with the radial direction r; and
b) a second orientation in which the base b of the cutting insert 1 facing away from the receiving seat 9 encloses an angle between 20° and 45° with the radial direction r.

By virtue of the invention, the milling tool 12 is versatile and can be used both for traditional milling operations with large cutting depths as well as for high feed milling with relatively small (typically below 2 mm) cutting depths and at high feed rates.

Figure 8:
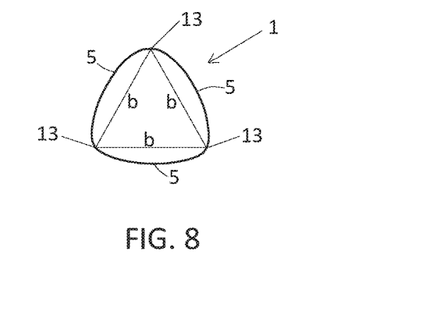
FIG. 8 is a schematic top view of the cutting insert of the invention for definition purposes.

FIG. 8 shows a schematic top view of a cutting insert 1 to denote the bases b of an inscribed triangle.

The following is a summary list of reference numerals and the corresponding structure used in the above description of the invention:
1 milling cutting insert
2 top side
3 underside
4 side surface
5 cutting edge
61, 62 abutment surface
7 bore
8 tool holder
9 seat
91 seat flank
10 chip breaker
11 workpiece
12 milling tool
13 cutting corner
14 transition area
R rotation axis
S central symmetry axis
b base of inscribed triangle

The invention claimed is:

1. A milling cutting insert, comprising:
a body having a substantially triangular shape defining a number of indexing positions, said body containing:
a top side;
an underside;
circumferential side surfaces extending between said top side and said underside;
cutting edges being formed at a transition of said circumferential side surfaces to at least one of said top side or said underside;
at least two discrete planar abutment surfaces being formed on said circumferential side surfaces for positioning the milling cutting insert in a tool holder, wherein said at least two discrete planar abutment surfaces are inclined with respect to each other at an outer angle of between 190° and 220° and wherein said discrete planar abutment surfaces are spaced from each other with respect to a circumferential direction of the milling cutting insert; and
said discrete planar abutment surfaces being inclined with respect to each other such that when brought into contact to corresponding mating surfaces of the tool holder the milling cutting insert can assume two distinct angular positions for each indexing position.

2. The milling cutting insert according to claim 1, wherein said discrete planar abutment surfaces protrude from said circumferential side surfaces.

3. The milling cutting insert according to claim 1, wherein said circumferential side surfaces having recesses formed therein and said discrete planar abutment surfaces are formed in said recesses within said circumferential side surfaces.

4. The milling cutting insert according to claim 1, wherein said discrete planar abutment surfaces are formed such that in a top view on the milling cutting insert, said discrete planar abutment surfaces extend beyond a cutting edge formed at the transition of a circumferential side surface to said top side or underside, respectively.

5. The milling cutting insert according to claim 1, wherein said body has an ovalized triangular shape.

6. The milling cutting insert according to claim 1, wherein said cutting edges are at least partially convexly curved with respect to a side view of the milling cutting insert.

7. The milling cutting insert according to claim 1, wherein the milling cutting insert is adapted for radial mounting on the tool holder.

8. The milling cutting insert according to claim 1, wherein the milling cutting insert is double-sided.

9. The milling cutting insert according to claim 1, wherein said discrete planar abutment surfaces are substantially perpendicular to said top side.

10. A milling tool, comprising;
a rotation axis about which the milling tool is rotatable for milling, a radial direction perpendicular to the rotation axis;
milling cutting inserts, each including:
a body having a substantially triangular shape defining a number of indexing positions, said body containing:
a top side;
an underside;
circumferential side surfaces extending between said top side and said underside;
cutting edges being formed at a transition of said circumferential side surfaces to at least one of said top side or said underside;
at least two discrete planar abutment surfaces being formed on said circumferential side surfaces for positioning the milling cutting insert in a tool holder, wherein said at least two discrete planar abutment surfaces are inclined with respect to each other at an outer angle of between 190° and 220° and wherein said discrete planar abutment surfaces are spaced from each other with respect to a circumferential direction of the milling cutting insert;
a plurality of cutting insert receiving seats adapted for mounting said milling cutting inserts; and said cutting insert receiving seats are adapted such that said milling cutting inserts inserted in said cutting insert receiving seats can be positioned at two distinct angular positions for each indexing position of one of said milling cutting inserts.

11. The milling tool according to claim 10, wherein said milling cutting inserts are mounted in said cutting insert receiving seats.

12. The milling tool according to claim 10, wherein said milling cutting inserts are radially mounted in said cutting insert receiving seats.

13. A milling tool, comprising;
a rotation axis about which the milling tool is rotatable for milling, a radial direction perpendicular to the rotation axis;
milling cutting inserts, each including:
  a body having a substantially triangular shape defining a number of indexing positions, said body containing:
    a top side;
    an underside;
    circumferential side surfaces extending between said top side and said underside;
    cutting edges being formed at a transition of said circumferential side surfaces to at least one of said top side or said underside;
    at least two discrete planar abutment surfaces being formed on said circumferential side surfaces for positioning the milling cutting insert in a tool holder, wherein said at least two discrete planar abutment surfaces are inclined with respect to each other at an outer angle of between 190° and 220° and wherein said discrete planar abutment surfaces are spaced from each other with respect to a circumferential direction of the milling cutting insert;
a plurality of cutting insert receiving seats adapted for mounting said milling cutting inserts; and
said cutting insert receiving seats are adapted such that said milling cutting inserts are mountable to said cutting insert receiving seats in:
  a first orientation in which a base of a milling cutting insert facing away from a cutting insert receiving seat encloses an angle between 0° and 20° with the radial direction; and
  a second orientation in which said base of said milling cutting insert facing away from said cutting insert receiving seat encloses an angle between 20° and 45° with the radial direction.

* * * * *